US011432257B2

(12) United States Patent
Griffin

(10) Patent No.: US 11,432,257 B2
(45) Date of Patent: Aug. 30, 2022

(54) USER PROXIMITY DISCOVERY AND DATA IDENTIFICATION

(71) Applicant: Thomas Lewis Griffin, Avon, CO (US)

(72) Inventor: Thomas Lewis Griffin, Avon, CO (US)

( * ) Notice: Subject to any disclaimer, the term of this patent is extended or adjusted under 35 U.S.C. 154(b) by 416 days.

(21) Appl. No.: 16/048,270

(22) Filed: Jul. 28, 2018

(65) Prior Publication Data

US 2019/0037527 A1 Jan. 31, 2019

Related U.S. Application Data

(60) Provisional application No. 62/538,125, filed on Jul. 28, 2017.

(51) Int. Cl.
| | | |
|---|---|---|
| *H04W 64/00* | (2009.01) | |
| *H04W 76/11* | (2018.01) | |
| *H04W 4/02* | (2018.01) | |
| *H04W 88/18* | (2009.01) | |
| *H04W 88/10* | (2009.01) | |

(52) U.S. Cl.
CPC .......... *H04W 64/003* (2013.01); *H04W 4/02* (2013.01); *H04W 64/00* (2013.01); *H04W 76/11* (2018.02); *H04W 88/10* (2013.01); *H04W 88/184* (2013.01)

(58) Field of Classification Search
None
See application file for complete search history.

(56) References Cited

U.S. PATENT DOCUMENTS

| | | | |
|---|---|---|---|
| 7,549,576 B2 | 6/2009 | Alderucci et al. | |
| 8,427,278 B2 | 4/2013 | Petricoin, Jr. | |
| 9,209,945 B2* | 12/2015 | Liu | H04W 72/042 |
| 9,510,193 B2 | 11/2016 | Su et al. | |
| 9,542,695 B2* | 1/2017 | Russell | G06Q 30/06 |
| 9,648,014 B2* | 5/2017 | Tobin | G06Q 20/206 |
| 9,699,649 B2* | 7/2017 | Shanmugam | H04W 8/24 |
| 9,781,753 B2* | 10/2017 | Tsai | H04W 76/14 |
| 9,967,850 B2* | 5/2018 | Jung | H04W 76/14 |
| 10,021,726 B2* | 7/2018 | Wang | H04W 8/26 |
| 10,225,788 B2* | 3/2019 | Scherzer | H04W 28/08 |
| 10,230,783 B2* | 3/2019 | Rajan | A61B 5/0008 |
| 10,264,457 B2* | 4/2019 | Peterson | H04W 4/029 |
| 10,271,370 B2* | 4/2019 | Atarius | H04W 8/005 |
| 10,341,833 B2* | 7/2019 | Lekutai | H04W 76/11 |

(Continued)

FOREIGN PATENT DOCUMENTS

GB 2453383 8/2009

*Primary Examiner* — Gregory B Sefcheck
(74) *Attorney, Agent, or Firm* — Stovall Legal; Blake D. Stovall

(57) ABSTRACT

A device can receive a proximity message comprising a base station identifier and a network address. The device can determine that the device is within a particular distance of a base station associated with the base station identifier based, at least in part, on the proximity message. In response to a determination that the device is within the particular distance of the base station, the device can display an actionable notification. The device can further determine that an action associated with the actionable notification has been performed. In response to a determination that the action has been performed, the device can send a proximity notification to a server identified by the network address, wherein the proximity notification comprises the base station identifier.

9 Claims, 8 Drawing Sheets

(56) References Cited

U.S. PATENT DOCUMENTS

| | | |
|---|---|---|
| 10,349,451 B2 * | 7/2019 | Enomoto ............... H04W 76/11 |
| 10,382,955 B2 * | 8/2019 | Suh ..................... H04L 63/0428 |
| 10,587,656 B2 * | 3/2020 | Kim .................... H04L 65/1016 |
| 2005/0130634 A1 | 6/2005 | Godfrey |
| 2007/0186105 A1 | 8/2007 | Bailey |
| 2008/0041937 A1 | 2/2008 | Vawter |
| 2010/0283682 A1 | 11/2010 | Heidari-Bateni et al. |
| 2011/0055891 A1 | 3/2011 | Rice |
| 2011/0237224 A1 | 9/2011 | Coppinger |
| 2014/0301270 A1 * | 10/2014 | Johnsson ............ H04W 72/042 370/328 |
| 2015/0350826 A1 * | 12/2015 | Stone .................... G06Q 20/06 455/456.3 |
| 2016/0196582 A1 * | 7/2016 | Stone .................... H04W 4/023 705/14.58 |
| 2017/0026896 A1 * | 1/2017 | Enomoto ............... H04W 40/20 |
| 2017/0048897 A1 * | 2/2017 | Liang .................... H04W 76/14 |
| 2017/0079086 A1 * | 3/2017 | Kuge .................... H04W 76/14 |
| 2017/0347311 A1 * | 11/2017 | Iyer ......................... H04W 4/70 |
| 2018/0124584 A1 * | 5/2018 | Venkatraman ........ H04W 76/15 |
| 2018/0199262 A1 * | 7/2018 | Kuge ...................... H04W 8/00 |
| 2019/0311409 A1 * | 10/2019 | Russell ............ G06Q 10/06393 |

\* cited by examiner

US 11,432,257 B2

USER PROXIMITY DISCOVERY AND DATA IDENTIFICATION

RELATED APPLICATIONS

This application claims the priority benefit of U.S. of America Provisional Patent Application No. 62/538,125 filed Jul. 28, 2017.

BACKGROUND

Embodiments of the inventive subject matter generally relate to the field of computing systems, and, more particularly, to performing operations based on a user or device's proximity to a particular location.

Proximity detection technology allows devices (particularly mobile devices) to determine when they are within a particular distance of a particular location (e.g., a business, another device, etc.). When a device determines that the device is within the particular distance of the location, the device can perform one or more operations related to the location. Proximity detection technology can be used to determine a device's location using various techniques, such as using the global positioning system (GPS) or time difference of arrival (TDOA) of transmitted messages. Additionally, messages, such as beacons, can be passed between devices to assist with proximity detection. The messages may trigger a device to use proximity detection functionality or may directly use a proximity detection technique, such as TDOA. The messages may be designed to contain only data necessary to carry out their intended function, which may hinder the usefulness of the messages in certain situations. For example, messages may not include sufficient information to enable two-way communication, the message source may be limited to sending out messages and be incapable of receiving data, or the amount of data may be sufficiently limited that the message cannot be used for functionality other than determining proximity.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes example systems, methods, techniques, instruction sequences and computer program products that embody techniques of the inventive subject matter herein. However, it is understood that the described embodiments may be practiced without these specific details. For instance, although examples refer to mobile devices, servers, and base stations, any type of device may be used to perform the operations described herein. In other instances, well-known instruction instances, protocols, structures and techniques have not been shown in detail in order not to obfuscate the description.

Although technology to determining a user's proximity to a particular location exists, this technology generally limits the amount of information that can be exchanged. The limited amount of information may make it difficult to implement certain types of functionality. For example, consider a scenario in which a hotel has an employee terminal in the lobby. The hotel management may want to identify when a particular user has entered the hotel lobby and display information associated with that user on the employee terminal. A proximity device that wirelessly transmits messages may be installed in the hotel lobby, allowing the mobile device to determine that the mobile device is in the lobby. However, the limited amount of information contained in the messages transmitted by the proximity device may be insufficient to allow the mobile device to determine how to communicate with the employee terminal, thus preventing the user's information from being displayed on the terminal.

However, a system may be designed such that after a device (e.g., a mobile device) receives a proximity message (e.g., a beacon) containing a unique identifier, the mobile device sends a notification to a server or other computing system associated with the unique identifier. Based on receiving the notification, the server determines that the device is within a particular distance of the source of the proximity message. The server then identifies one or more computing systems associated with the unique identifier and sends user metadata to the one or more computing systems.

Figure 1:
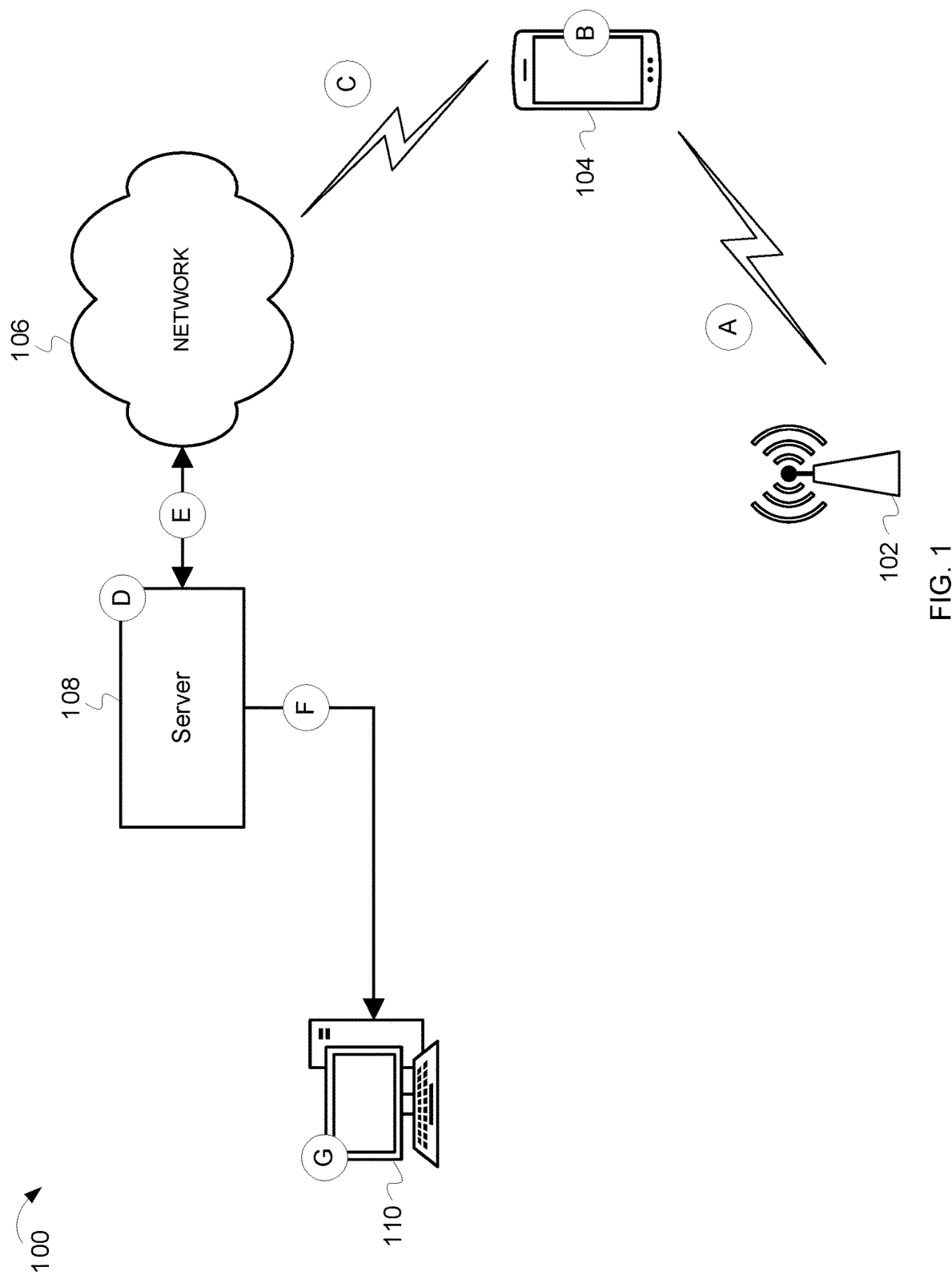
FIG. 1 depicts an example system and operations for performing one or more operations in response to determining that a user is within a particular distance of a base station.

FIG. 1 depicts an example system and operations for performing one or more operations in response to determining that a user is within a particular distance of a base station. FIG. 1 depicts a set of components 100 including a base station 102, a mobile device 104, a network 106, a server 108, and a computing system 110. For the purposes of this example, a base station may be any kind of message source capable of performing the operations of the base station 102, as described below.

At stage A, the base station 102 sends a proximity message. A proximity message is any type of message that can be used by the mobile device 104 to determine the distance between the base station 102 and the mobile device 104. The proximity message can be a Wi-Fi® data frame, a mobile beacon, etc. The base station 102 can send out proximity messages at regular intervals, variable intervals, or in response to a triggering event. For example, if the base station 102 has determined that a device, such as the mobile device 104, is within range of the base station 102, the base station 102 may send out proximity messages at shorter intervals than if no device is determined to be within range of the base station 102. As another example, the base station 102 may detect a broadcast signal or other notification from the mobile device 104 and send a proximity message in response to receiving the notification.

Proximity messages are generally designed to include as little data as possible given the particular implementation. For example, a proximity message may include a base station identifier, a network address for establishing communication with the base station 102 or other device, a timestamp, etc. In this example, the proximity message sent by the base station 102 includes at least a base station identifier and a network address for the server 108, such as an Internet Protocol (IP) address or a uniform resource identifier (URI). The base station identifier may be any kind of identifier that uniquely identifies the base station among a set of devices, such as a universally unique identifier (UUID). The base station identifier may be a unique combination of identifiers. For example, the base station 102 may be associated with a particular business that has multiple base stations. The base station identifier may thus be a combination of an identifier associated with the business and an identifier that differentiates the base station 102 from the other base stations associated with the business. Some UUID implementations may support a similar hierarchically-structured identifier scheme using major values and minor values or similar techniques. The UUID itself may be assigned to the business itself, which may then assign unique major values to various physical locations and unique minor values to different base stations located at the individual properties.

In some implementations, multiple base stations may use the same base station identifier. For example, a business may have multiple base stations and may not have a need to identify which of the base stations the mobile device is within the particular distance of. In other words, it may be sufficient to determine that the mobile device is within the particular distance of any of the base stations. In such implementations, the base station identifier may actually be another identifier (e.g., a business identifier) that does not uniquely identify the particular base station. For the examples described herein, the term "base station identifier" describes any single identifier or combination of identifiers that identify the base station 102 (or related entity) sufficiently to perform the operations described herein.

In this example, the base station 102 is illustrated as sending the proximity message wirelessly, which can be done using technology such as Wi-Fi™, Bluetooth™ etc. In some implementations, the base station 102 may send the proximity message over a wired network. Such an implementation may allow non-wireless devices or wireless devices that are incompatible with the wireless technology used by the base station 102 to determine that the devices are within a particular distance of the base station 102 when connected to a wired network. For example, a device, such as a laptop, may connect to a hotel local area network (LAN) via an Ethernet™ cable. If the base station 102 is also connected to the hotel LAN, the device may receive a proximity message sent out by the base station 102 over the hotel LAN.

Further, although FIG. 1 depicts the base station 102 as sending the proximity message directly to the mobile device 104, the base station 102 may use one or more intermediary devices. For example, the base station 102 may be connected to a wireless access point (WAP) via a wired network and may send the proximity message, via the wired network, to the WAP. The WAP may then send the proximity message to the mobile device 104.

At stage B, the mobile device 104 receives the proximity message from the base station 102 and extracts the base station identifier and network address from the proximity message. Extracting the base station identifier and network address from the proximity message can include decoding the proximity message from a format used during transmission, identifying the format used by the proximity message, and/or reading the base station identifier and network address from the decoded proximity message.

At stage C, the mobile device 104 sends a proximity notification to the server 108. The proximity notification may be any message sent from the mobile device 104 to the server 108 that allows the server 108 to determine that the mobile device 104 is within the particular distance of the base station 102. The proximity notification may be a request for data associated with the base station 102 (or other related entity, such as a business associated with the base station 102) or an explicit notification that the mobile device 104 is within the particular distance of the base station 102. For example, the proximity notification may be a request for a webpage that provides information associated with the business that owns the base station 102 or may be a one way message that identifies the base station 102.

The specific technique used to send the proximity notification can vary between implementations. For example, if the network address is a uniform resource locator (URL), the mobile device 104 may send the proximity notification using a protocol identified by the URL. As another example, the mobile device 104 may be configured to use an application programming interface (API) to communicate with the server 108. In such an implementation, the proximity notification may be configured to communicate with the server 108 in a manner specified by the API and/or any protocol utilized by the API.

The proximity notification may identify the proximity message received at stage B (e.g., using the base station identifier), the mobile device 104, a user associated with the mobile device 104, an account associated with the user or mobile device 104, etc. For example, if the mobile device 104 has metadata associated with the network address stored on the mobile device 104, such as HTTP cookies or a session identifier, the mobile device 104 may include that metadata in the proximity notification. The examples herein describe the proximity notification as including at least a user identifier. The term "user identifier" includes any identifier usable to perform the operations described herein. For example, the server 108 may map a mobile device identifier to user metadata (e.g., a user account). Thus, the mobile device 104 may send an identifier associated with the mobile device 104 itself, which serves as a proxy for identifying the user, instead of sending an identifier specifically associated with the user. As another example, the user identifier may be a username or e-mail address used by the user to log into a particular account.

As depicted in FIG. 1, the mobile device 104 can send the proximity notification wirelessly via the network 106. The wireless transmission may be received via a wireless antenna (e.g., cellular antenna), WAP, or other mechanism and then sent to the network address via a wired network, as depicted in FIG. 1. Implementations may vary, however. For example, network 106 can comprise many different networks, multiple wired/wireless network transmissions, etc. Further, the mobile device 104 may send the proximity notification via a wired connection to the network 106 instead of utilizing a wireless connection.

At stage D, the server 108 receives and processes the proximity notification from the mobile device 104. To process the proximity notification, the server 108 may extract the base station identifier and user identifier from the proximity notification. Using the base station identifier, the server 108 identifies base station metadata associated with the base station 102 or related entity. For example, if the base station 102 is located within a hotel, the server 108 may identify a web page that includes information describing the hotel and related amenities. Additionally, the server 108 determines that the computing system 110 is associated with the base station 102. For example, the server 108 may use the base station identifier as a key to identify an entry in a mapping table or to query a database. The entry or database may map the base station identifier to a computing system identifier associated with the computing system 110. Metadata used to determine that the computing system 110 is associated with the base station 102 may be included in the aforementioned base station metadata, may be included in computing system metadata associated with the computing system 110, or may be separate from the base station metadata and the computing system metadata.

Using the user identifier, the server 108 identifies user metadata. The user metadata can include various data associated with the user, such as a name, contact information, user preferences, discount offers, etc. In some implementations, the server 108 identifies a subset of the of the user metadata to send to the computing system 110 using the computing system metadata. For example, the computing system 110 may only be configured to use the user's contact information. Thus, the computing system metadata may specify that the user's contact information is to be sent to the computing system 110 instead of all the user metadata.

At stage E, the server 108 sends a response to the mobile device 104. The response can include the base station metadata as determined at stage D. The response can include other data, such as confirmation that the proximity notification sent by the mobile device 104 at stage C was received, a confirmation that the user metadata was sent to the computing system 110, etc. The particular operations used to send the response to the mobile device 104 may vary between implementations. For example, the response may be encoded based on the capabilities of the mobile device 104, whether the request was sent by a web browser or native application on the mobile device 104, etc. Additionally, the operations performed at stage E are optional; in some implementations the server 108 might not send a response to the mobile device 104.

At stage F, the server 108 sends the user metadata to the computing system 110. If the server 108 identified a subset of the user metadata to be sent to the computing system 110, the server 108 may only send the identified subset of the user metadata. The particular operations used to send the user metadata to the computing system 110 may vary between implementations. For example, the user metadata may be included in an initial message to the computing system 110 or may be sent in response to a request for the user metadata from the computing system 110. For example, an initial message sent to the computing system 110 may merely be an indication that the mobile device 104 is within the particular distance of the base station 102, thus requiring the computing system 110 to request additional user metadata as needed.

At stage G, the computing system 110 receives the user metadata and performs one or more operations based, at least in part, on the user metadata. The particular operations performed by the computing system 110 can vary between implementations and based on the particular function of the computing system 110. For example, if the computing system 110 runs hotel management software, the computing system 110 may display the user metadata so that the hotel employee(s) have information about the user. As another example, if the computing system 110 takes payments for goods or services, the computing system 110 may determine prices for the goods or services. Similarly, if the computing system 110 provides access to goods or services, the computing system 110 may determine whether the user has access to the goods or services and perform operations to allow the user to access the goods or services (e.g., unlocking a door or disabling other access control functionality).

Although described sequentially, the order in which the operations described in FIG. 1 can be performed may vary. For example, the server 108 may send the user metadata to the computing system 110 (stage F) before sending a response to the mobile device 104 (stage E). Similarly, the server 108 may send the response to the mobile device 104 (stage E) immediately after determining the data to include in the response (stage D) and before identifying the user metadata (stage D). In other words, some of the operations of stage E may be performed before some of the operations of stage D are completed. Further, some operations may be performed in parallel. For example, the server 108 may perform some or all of the operations at stage F at the same time as the server 108 performs some or all of the operations at stage E.

Although the various components depicted in FIG. 1 are described as being certain types of devices, the operations described in FIG. 1 can be performed by any device configured to perform such operations. For example, the operations performed by the mobile device 104 may instead be performed by any computing device, such as a desktop computer. Similarly, the term "computing system" (e.g., computing system 110) is used to refer to devices that provide any kind of computing functionality, such as smart locks, credit card readers, etc. Additionally, any of the components described in FIG. 1 may be virtual components, such as a virtual machine (or, in the case of the network 106, a virtual or software-defined network).

Figure 2:
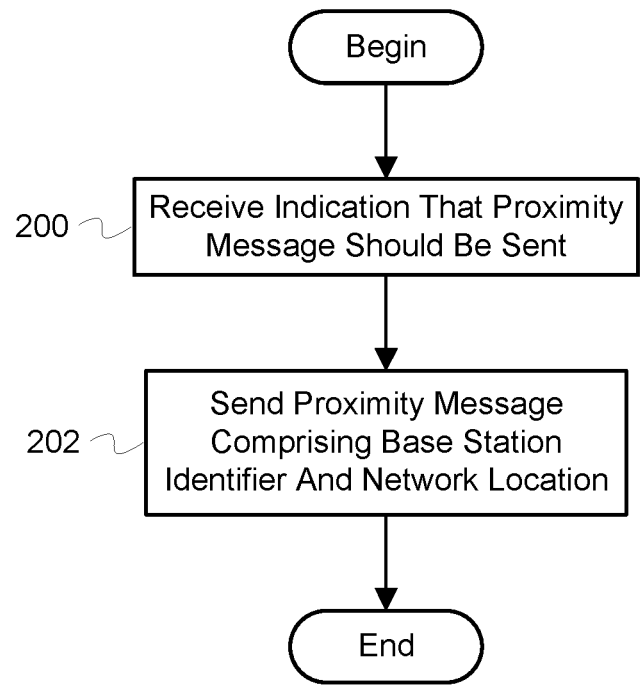
FIG. 2 depicts a flowchart of example operations for sending a proximity message from a base station to another device.

FIG. 2 depicts a flowchart of example operations for sending a proximity message from a base station to another device. The operations depicted in FIG. 2 can be performed by a base station, such as base station 102 in FIG. 1, or any suitable device.

At block 200, a base station receives an indication that a proximity message should be sent. The particular indication received can vary between implementations. For example, the indication may be a notification from a timer within the base station indicating that a particular period of time has elapsed. As another example, the indication may be the reception of a broadcast message, ping message, or beacon from another device. After the base station receives the indication that the proximity message should be sent, control flows to block 202.

At block 202, the base station sends a proximity message comprising at least a base station identifier and a network address. The base station identifier may be unique to the base station and identifies the particular base station that sent the proximity message. The base station identifier may also identify a particular physical location by virtue of the base station being associated with that physical location. For example, if a base station is associated with a particular business, the base station identifier may implicitly or explicitly identify the business. In some implementations, a single base station identifier may be used for multiple base stations. For example, if a business uses multiple base stations but does not need to differentiate between each base station, each base station may use a single base station identifier. The network address can be any value usable to communicate with another device, such as an IP address or a URL. In some implementations, the base station identifier and the network address identifier may be combined. For example, if the network address is a URL, the base station identifier may be embedded in the URL as a path component or query string component. Additionally, in some implementations, the network address may be the network address for the base station, thus serving as both the network address and the base station identifier.

The proximity message may include additional information as well. For example, the proximity message may include data identifying the particular geolocation of the base station, such as Global Positioning System (GPS) coordinates. As another example, the proximity message may include a timestamp usable to determine the distance between the base station and a receiving device. After the base station sends the proximity message, the process ends.

Figure 3:
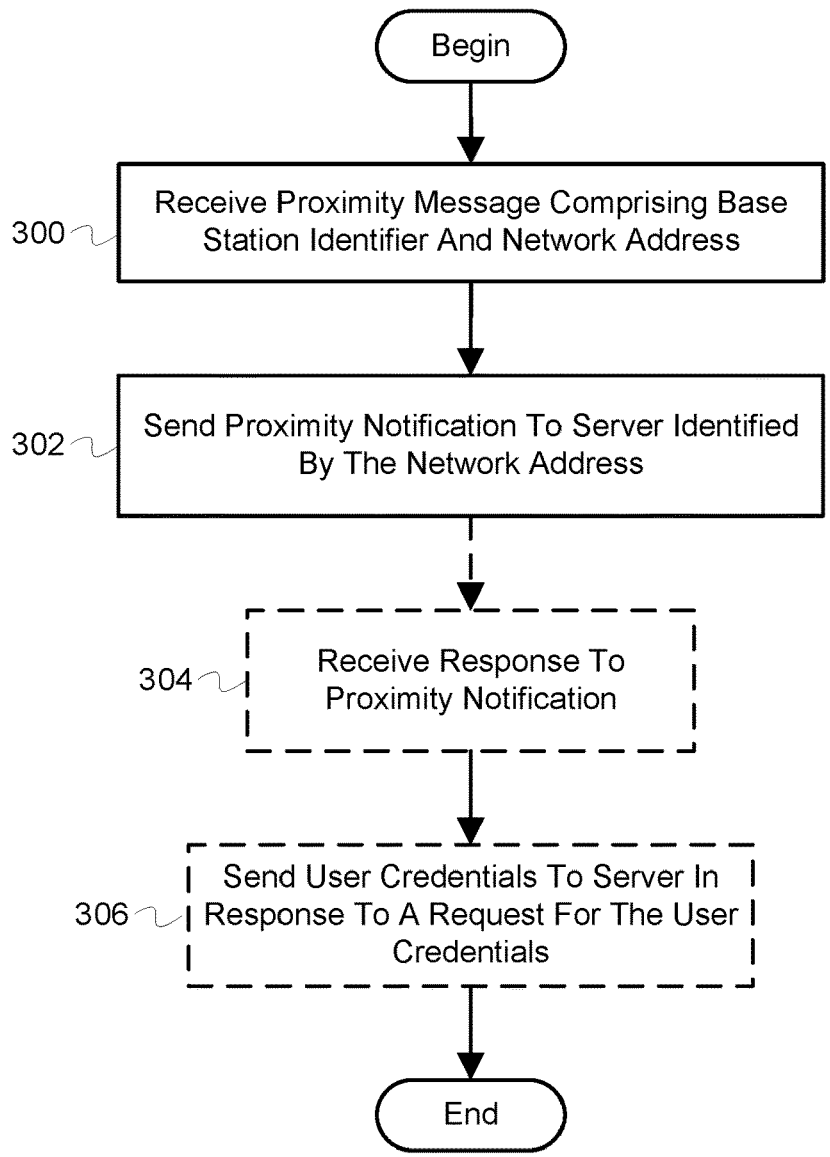
FIG. 3 depicts a flowchart of example operations for receiving and processing a proximity message by a mobile device.

FIG. 3 depicts a flowchart of example operations for receiving and processing a proximity message by a mobile device. The operations depicted in FIG. 3 can be performed by the mobile device 104 of FIG. 1 or any suitable device. A block with a dashed outline indicates an optional operation.

At block 300, a mobile device receives a proximity message from a base station. The proximity message comprises at least a base station identifier and a network address. The base station identifier identifies the base station itself or an entity associated with the base station (e.g., a business). The network address can be used by the mobile device to send a request over a network. After the mobile device receives the proximity message from the base station, control flows to block 302.

At block 302, the mobile device sends a proximity notification to a server associated with the network address included in the proximity message. The specific proximity notification sent to the server can vary between implementations. For example, the network address may be a URL and the proximity notification may be an HTTP request sent to the server. As another example, the network address may be an IP address and a Transmission Control Protocol (TCP) request may be sent to a particular port of a device identified by the IP address.

The proximity notification includes the base station identifier. The specific technique used to include the base station identifier in the proximity notification can vary between implementations. For example, if the network address is a URL, the base station identifier may be included as a path component or query string component of the URL. If the proximity notification is an HTTP request, the base station identifier might be included in an HTTP header field. If the proximity notification is an HTTP POST request, the base station identifier can be included in the body of the proximity notification. If the proximity notification uses a different protocol, the base station identifier can be included in the proximity notification as specified by the particular protocol.

The proximity notification may also include a user identifier. The user identifier may be any identifier usable by the server to identify user metadata associated with a user of the mobile device. For example, the user identifier may be a mobile device identifier, a username, an account identifier, etc. The user identifier can be included in the proximity notification using techniques like those used to include the base station identifier. For example, if the proximity notification is an HTTP request, the user identifier may be included in as part of the HTTP cookie header fields. In some implementations, the proximity notification does not include a user identifier, which may be sent in response to a request from the server, as described below in relation to block 306. After the mobile device sends the proximity notification to the server, control flows to block 304.

At block 304, the mobile device receives a response to the proximity notification sent at block 302. The response may be received asynchronously, as indicated by the dashed line between block 302 and block 304. The response may include data related to the base station or one or more locations associated with the base station, or may include a confirmation that a message sent from the server to another computing system was successfully sent. In some implementations, no response may be received. In some implementations, the response may include a request for user credentials. For example, the response may cause a form allowing a user to enter credentials to be displayed or the response may include code or instructions requesting previously stored user credentials. In such implementations, control flows to block 306, otherwise, the process ends.

At block 306, the mobile device sends user credentials to the server in response to a request for the user credentials. The user credentials may include a user identifier, username, password, etc. The specific technique used to send the request can vary similarly to the techniques used to send the request described in relation to block 302. After the mobile device sends the user credentials to the server, the process ends.

As noted in the description of block 302, the user credentials may already be stored on the mobile device and thus may be sent with the initial request sent to the server at block 302, making block 306 optional.

Figure 4:
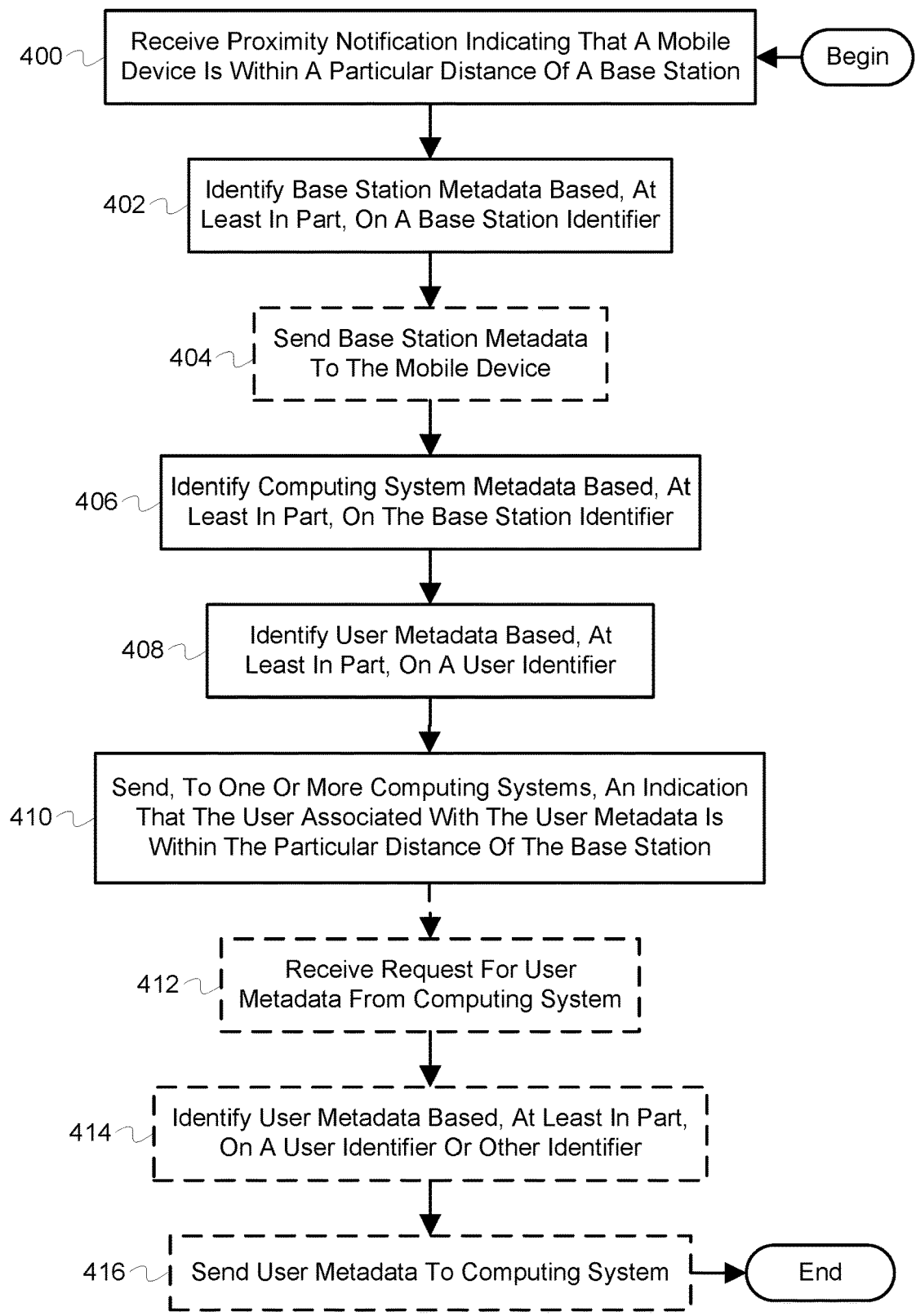
FIG. 4 depicts a flowchart of example operations of a server receiving a proximity notification.

FIG. 4 depicts a flowchart of example operations of a server receiving a proximity notification. The operations depicted in FIG. 4 can be performed by the server 108 of FIG. 1 or any suitable device. A block with a dashed outline indicates an optional operation.

At block 400, a server receives proximity notification. The proximity notification may be any message that allows the server to determine that a device is within a particular distance of a base station. The proximity notification comprises at least a base station identifier and, in the example discussed herein, also comprises a user identifier. The user identifier can be an identifier associated with a user account, a mobile device identifier, or any identifier usable to identify metadata associated with the user. In some implementations, the proximity notification may include a request for data associated with the base station. After the server receives the indication that the mobile device is within a particular distance of the base station, control flows to block 402.

At block 402, the server identifies base station metadata based, at least in part, on the base station identifier. The server can identify the base station metadata by using the base station identifier to query a database, identify an entry in a mapping table, etc. The base station metadata can comprise information about the base station itself, information about a location or entity (e.g., business) associated with the base station, etc. The base station metadata identified can also be dependent on the proximity notification received at block 400. For example, the proximity notification at block 400 may include a request for a web page associated with the base station. The server may thus identify the web page and ignore other base station metadata based on the specific request. After the server identifies the base station metadata and if the proximity notification received at block 400 includes a request for the base station metadata, control flows to block 404. After the server identifies the base station metadata and if the proximity notification received at block 400 does not include a request for the base station metadata, control flows to block 406.

At block 404, the server sends the base station metadata to the mobile device. The particular technique used to send the base station metadata to the mobile device can vary. For example, if the request for the base station metadata was an HTTP request, the server may send the base station metadata as part of an HTTP response. If the request for the base station metadata was made based on a different protocol, the server may send the base station metadata as specified by the protocol. After the server sends the base station metadata, control flows to block 406.

At block 406, the server identifies computing system metadata based, at least in part, on the base station metadata. The base station metadata may include one or more computing system identifiers. The computing system identifiers can be used to identify the computing system metadata by querying a database, identifying an entry in a mapping table, etc. For the purposes of the examples herein, the computing system metadata comprises at least one or more network addresses (e.g., IP addresses, URIs, etc.) usable to communicate with one or more computing systems. The computing system metadata may also specify data of the user metadata that is used by the one or more computing systems. After the server identifies the computing system metadata, control flows to block 408.

At block 408, the server identifies user metadata based, at least in part, on a user identifier. To identify the user metadata, the server may use the user identifier included in the proximity notification received at block 400 to query a database, identify an entry in a mapping table, etc. The user metadata can comprise a variety of data, such as a name, a user picture, credit card information, loyalty program information, reservation information, etc. After the server identifies the user metadata, control flows to block 410.

At block 410, the server sends, to the one or more computing systems, user metadata. The particular user metadata sent can vary between implementations. In some implementations, for example, the user metadata may include all available user metadata or a subset of the user metadata usable by the one or more computing systems. In some implementations, the user metadata may be a notification that the particular user is within the particular distance of the base station but may not include all of the data usable by the one or more computing systems. For example, the user metadata may be a user identifier or may be a generic indication that a user is within the particular distance of a base station. In such an implementation, the one or more computing systems may be implemented to request the additional user metadata instead of being implemented to receive all of the user metadata by default. In some implementations (such as those in which the computing system sends a request for additional user metadata in response to receiving the initial user metadata), the initial user metadata may include an identifier associated with transmission itself. For example, instead of sending a user identifier or other explicit user metadata, the server may send an identifier that maps to the user metadata. For the purposes of the descriptions herein, "user metadata" includes any metadata associated with a user or any metadata that may be used to access, query, or otherwise identify user metadata. After the server sends the user metadata and if the one or more computing systems are implemented to send a request for additional user metadata, control flows to block 412. After the server sends the user metadata and if the one or more computing systems are not implemented to send a request for additional user metadata, the process ends.

At block 412, the server receives, from a computing system of the one or more computing systems, a request for additional user metadata. The request may include a user identifier or an identifier associated with a message sent at block 410. In some implementations, the request may specify the user metadata that should be sent to the computing system. After the server receives the request for the additional user metadata, control flows to block 414.

At block 414, the server identifies user metadata based, at least in part, on the identifier included in the request for additional user metadata received by the server at block 408. As noted in the description of the operations performed at block 408, the identifier may be a user identifier, identifier identifying a message sent at block 410, etc. If the request received at block 412 includes a user identifier, the server may use the user identifier to identify the user metadata by querying a database, identifying an entry in a mapping table, etc. If the request received at block 412 includes an identifier identifying a message sent at block 410, the server may use the identifier to identify user metadata associated with the message sent at block 410. If the request specifies the user metadata that should be sent to the computing system, the server may restrict the user metadata identified to the user metadata specified in the request. After the server identifies the user metadata, control flows to block 416.

At block 416, the server sends the user metadata identified at block 414 to the computing system. If the request received from the computing system at block 412 specifies the user metadata to send to the computing system and if the server did not restrict the user metadata identified at block 414 to that specified by the request, the server may discard or otherwise ignore user metadata that was not specified by the request. After the server sends the user metadata identified at block 414 to the computing system, the process ends.

As noted above, the operations in blocks 412, 414, and 416 may be optional based on the specific implementation. For example, the indication sent at block 410 may include the minimum amount of data needed by the computing system to determine that the user is within the particular distance of the base station. The computing system may then display a notification to a user of the computing system and require the user of the computing system to acknowledge the notification before the computing system requests the additional user metadata from the server. As another example, if the computing system controls the purchasing of a good or service, the computing system may not request the additional user metadata unless the user attempts to make a purchase.

Figure 5:
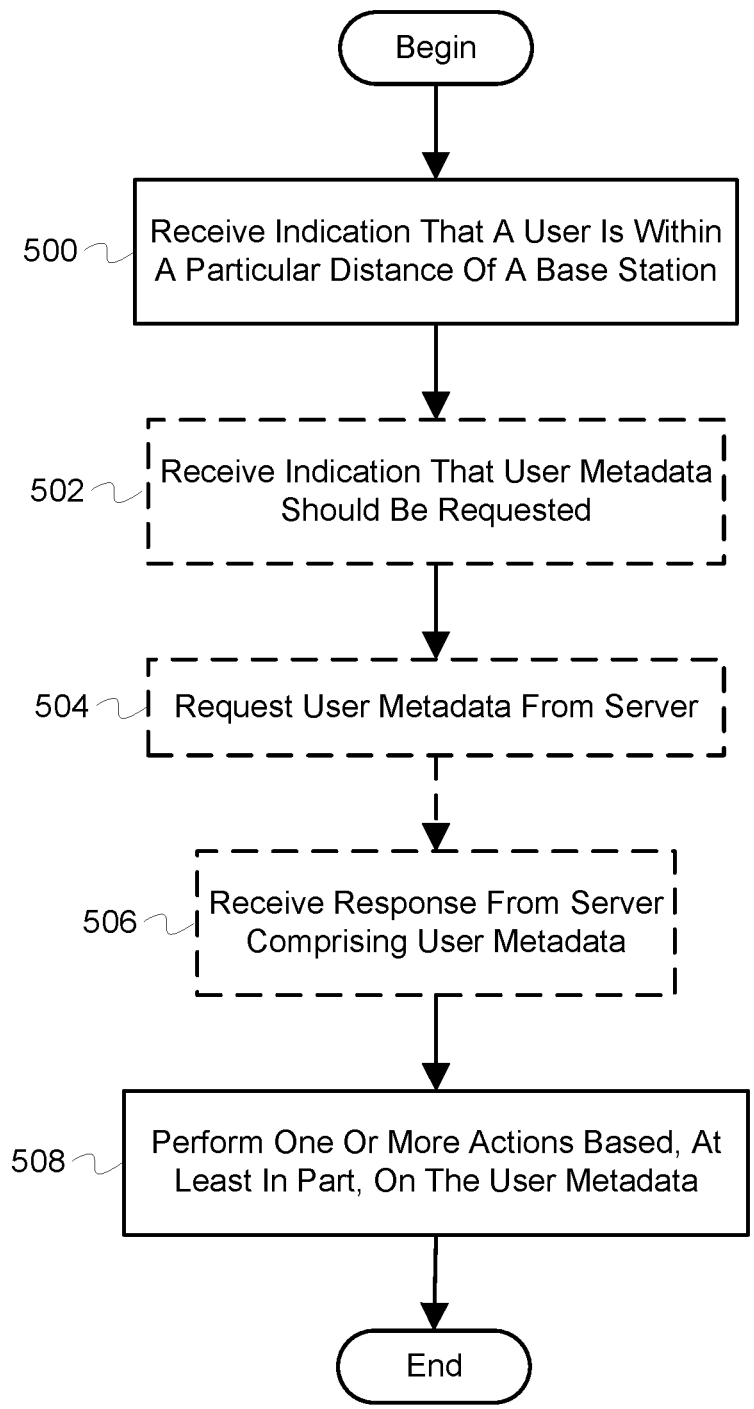
FIG. 5 depicts a flowchart of example operations of a computing system configured to perform one or more operations in response to receiving an indication that a user is within a particular distance of a base station.

FIG. 5 depicts a flowchart of example operations of a computing system configured to perform one or more operations in response to receiving an indication that a user is within a particular distance of a base station. The operations depicted in FIG. 5 can be performed by the computing system 110 of FIG. 1 or any suitable device. A block with a dashed outline indicates an optional operation.

At block 500, a computing system receives an indication that a user is within a particular distance of a base station. The indication may be similar to the indication sent by a server, as described in relation to the operations at block 410 of FIG. 4. For this example, the indication comprises at least user metadata and the user metadata comprises at least a user identifier. The user metadata may also include additional metadata, such as the name of the user, a picture of the user, user contact information, user account information, etc. After the computing system receives the indication that the user is within the particular distance of the base station, control flows to either block 502 or block 508, as described below.

The operations performed at blocks 502, 504, and 506 may be performed when the server (as depicted in FIG. 4) is implemented to send some of the user metadata in response to a request from the computing system instead of sending the user metadata with the initial indication described at block 406 of FIG. 4. If the server is implemented to send all of the user metadata that the computing system may use in the initial indication sent to the computing system, as described at block 406 of FIG. 4, the operations at blocks 502, 504, and 506 may not be performed.

At block 502, the computing system receives an indication that user metadata should be requested. For example, the indication may be a user click, an indication that a user is making a purchase, or the indication received at block 500 (i.e., the computing system may automatically request the user metadata in response to receiving the indication at block 500). After receiving the indication that user metadata should be requested, control flows to block 504.

At block 504, the computing system requests user metadata from the server. The request comprises an identifier that allows the server to determine the user metadata to send. For example, the identifier may be a user identifier or an identifier associated with the indication received at block 500. The request may also specify which metadata of the user metadata should be sent. For example, the request may specify that the server send the user's name, photo, and contact information. After the computing system requests the user metadata from the server, control flows to block 506.

At block 506, the computing system receives, from the server, a response comprising the user metadata requested at block 504. The particular user metadata included in the response may be the user metadata requested by the computing system at block 504, a subset of all of the user metadata, or all of the user metadata. After receiving the user metadata, control flows to block 508.

At block 508, the computing system performs one or more operations based, at least in part, on the user metadata. In some instances, the computing system may parse the user metadata and extract relevant values, but the specific operations performed may depend on the particular use of the computing system. For example, if the computing system is a terminal that runs a hospitality management system, the operations may include displaying the user metadata on a display. As another example, if the computing system is an access control device, the operations may include determining whether the user has access to a particular location controlled by the access control device and allowing or denying the user entry as appropriate. Other operations that the computing system may perform are described in other examples herein. After the computing system performs the one or more operations, the process ends.

Figure 6:
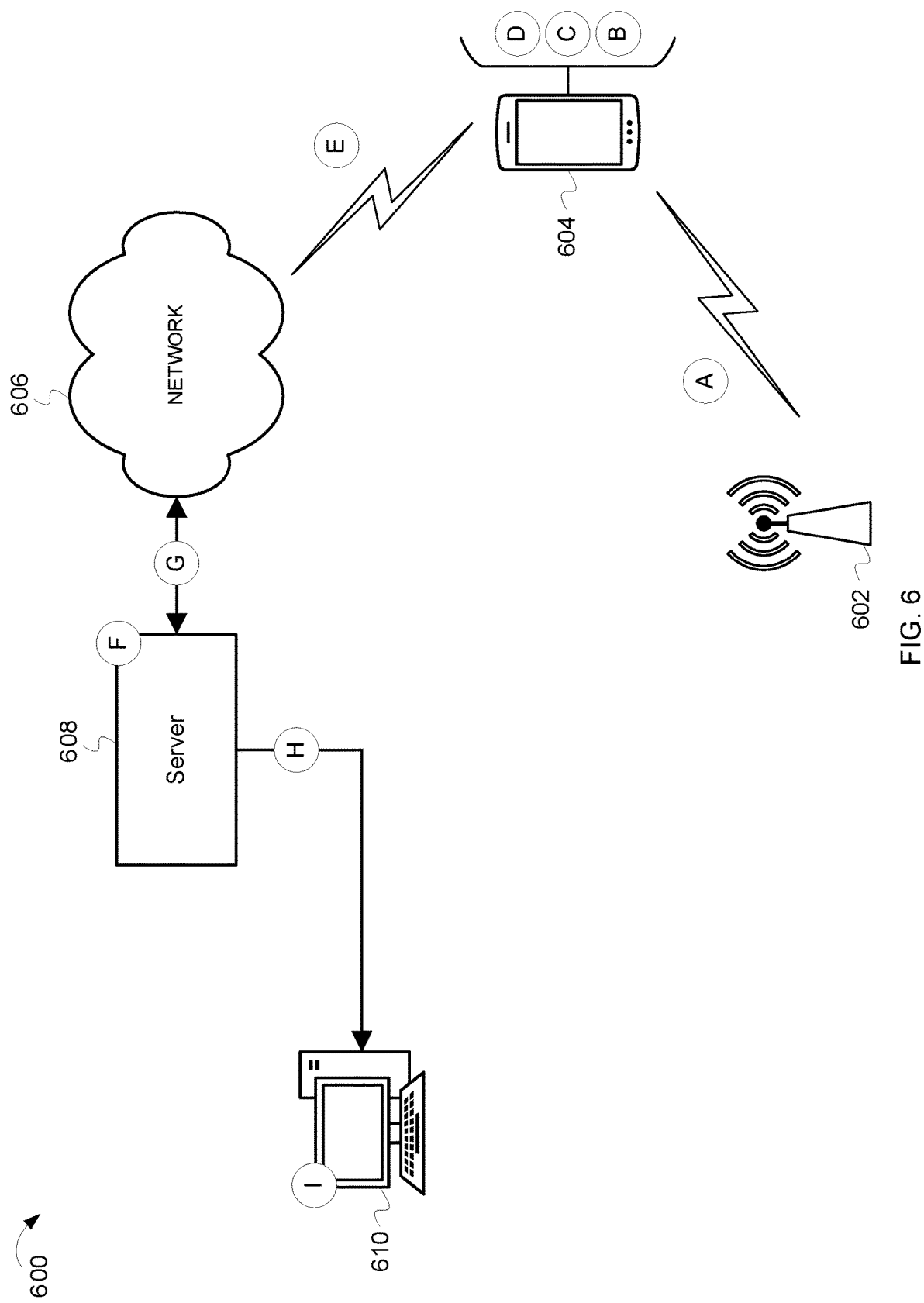
FIG. 6 depicts example components and operations for performing one or more operations in response to determining that a user is within a particular distance of a base station according to a second embodiment.

FIG. 6 depicts example components and operations for performing one or more operations in response to determining that a user is within a particular distance of a base station according to a second embodiment. FIG. 6 depicts a set of components 600 including a base station 602, a mobile device 604, a network 606, a server 608, and a computing system 610. For the purposes of this example, a base station may be any kind of message source.

At stage A, the base station 602 sends a proximity message. The operations performed at stage A can be substantially similar to the operations performed at stage A of FIG. 1.

At stage B, the mobile device 604 receives the proximity message from the base station 602 and extracts the base station identifier and network address from the proximity message. The operations performed at stage B can be substantially similar to the operations performed at stage B of FIG. 1.

At stage C, the mobile device 604 displays an actionable (e.g., capable of being clicked, tapped, etc.) notification. The actionable notification may be associated with the network address extracted at stage B, allowing the mobile device 604 to utilize the network address as described below at stage E. For example, the network address may be embedded in a URL or associated with a button that, when clicked on, passes the network address to an application via an API. In addition to the aforementioned URL or button, the actionable notification may be a notification on the display of the phone that may respond to various gestures input via the user's finger. For example, the user may make a horizontal motion on the notification (e.g., sliding across the notification) to trigger the action associated with the notification.

At stage D, the mobile device 604 receives an indication that the user triggered the action associated with the actionable notification. The particular indication may vary. For example, the indication may merely indicate that an action was taken on a particular notification or may include additional data, such as the network address. As noted at stage C, the particular action taken by the user can vary according to the particular notification implementation.

At stage E, the mobile device 604 (or software running thereon) sends a proximity notification to the server 608 in response to receiving the indication at stage D. The operations performed at stage E can be substantially similar to the operations performed at stage C of FIG. 1.

At stage F, the server 608 receives and processes the proximity notification from the mobile device 604. The operations performed at stage F can be substantially similar to the operations performed at stage D of FIG. 1.

At stage G, the server 608 sends a response to the mobile device 604. The operations performed at stage G can be substantially similar to the operations performed at stage E of FIG. 1.

At stage H, the server 608 sends the user metadata to the computing system 610. The operations performed at stage H can be substantially similar to the operations performed at stage F of FIG. 1.

At stage I, the computing system 610 receives the user metadata and performs one or more operations based, at least in part, on the user metadata. The operations depicted at stage I can be substantially similar to the operations performed at stage G of FIG. 1.

Although described sequentially, the order in which the operations described in FIG. 6 can be performed may vary. For example, the server 608 may send the user metadata to the computing system 610 (stage H) before sending a response to the mobile device 604 (stage G). Similarly, the server 608 may send the response to the mobile device 604 (stage G) immediately after determining the data to include in the response (stage F) and before identifying the user metadata (stage F). In other words, some or all of the operations of stage G may be performed before the operations of stage F are completed. Further, some operations may be performed in parallel. For example, the server 608 may perform some or all of the operations at stage H at the same time as the server 608 performs some or all of the operations at stage G.

Although the various components depicted in FIG. 6 are described as being certain types of devices, the operations described in FIG. 6 can be performed by any device configured to perform such operations. For example, the operations performed by the mobile device 604 may instead be performed by any computing device, such as a desktop computer. Similarly, computing system 610 is not limited to a computer, but may include devices such as smart locks. Additionally, any of the components described in FIG. 6 may be virtual components, such as a virtual machine (or, in the case of the network 606, a virtual or software-defined network).

In the example depicted in FIG. 6, the operations performed by the various components, except the mobile device, may be similar. As such, the operations described in FIGS. 2, 4, and 5 apply to this example. The operations depicted in FIG. 3, performed by a mobile device, vary from those of FIG. 3 and are thus depicted in FIG. 7.

Figure 7:
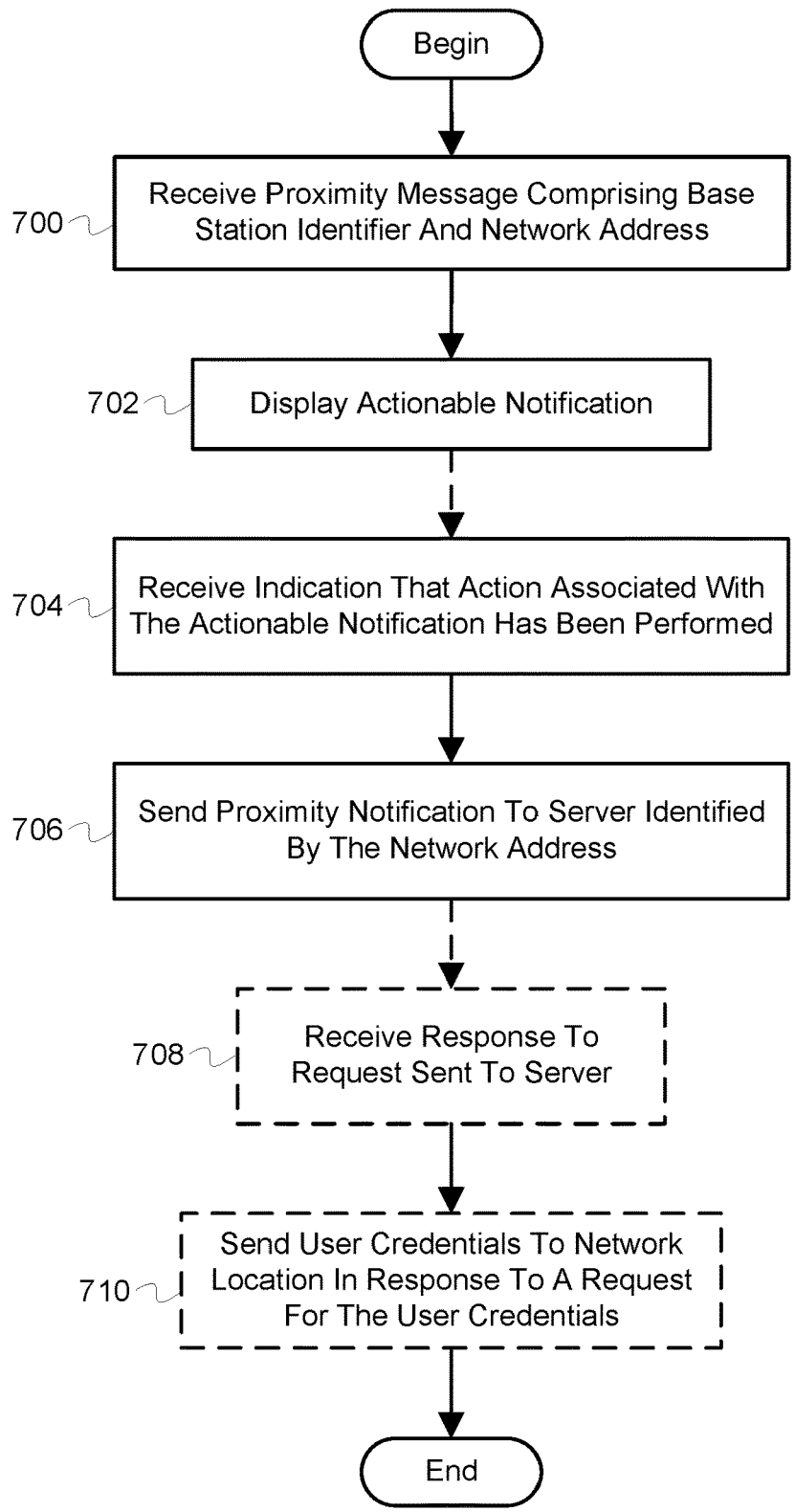
FIG. 7 depicts a flowchart of example operations for receiving and processing a proximity message by a mobile device.

FIG. 7 depicts a flowchart of example operations for receiving and processing a proximity message by a mobile device. The operations depicted in FIG. 7 can be performed by the mobile device 604 of FIG. 6 or any suitable device. A block with a dashed outline indicates an optional operation.

At block 700, a mobile device receives a proximity message from a base station. The operations performed by the mobile device at block 700 can be substantially similar to the operations performed by the mobile device at block 300 of FIG. 3. After the mobile device receives the proximity message from the base station, control flows to block 702.

At block 702, the mobile device displays an actionable notification. The notification may include data associated with the proximity message received at block 700. For example, the notification may include a clickable link that, when clicked, causes a web browser to launch. As another example, the notification may be respond to a swiping gesture. When the user makes a swiping gesture over the notification (i.e., on a portion of a screen of the mobile device associated with the notification), the mobile device causes a software application to launch on the mobile device. After the mobile device displays the actionable notification, control flows to block 704.

At block 704, the mobile device receives an indication that the action associated with the actionable notification has been performed. The action may vary and may include the actions described at block 702 (such as clicking or using a gesture). The particular indication can vary. For example, the indication may identify the action performed and/or include data associated with the notification, such as a network address received as part of the proximity message received at block 300. As denoted by the dashed line between block 702 and block 704, the operations depicted at block 704 are performed asynchronously in response to receiving the indication. After the mobile device receives an indication that the action associated with the actionable notification has been performed, control then flows to block 706.

At block 706, the mobile device sends a proximity notification to a server identified by the network address. The operations performed by the mobile device at block 706 can be substantially similar to the operations performed by the mobile device at block 302 of FIG. 3. After the mobile device sends the proximity notification to the server identified by the network address, control flows to block 708.

At block 708, the mobile device receives a response to the proximity notification sent at block 706. The operations performed by the mobile device at block 708 can be substantially similar to the operations performed by the mobile device at block 304 of FIG. 3. After the mobile device receives the response to the proximity notification sent at block 706, control flows to block 710.

At block 710, the mobile device sends user credentials to the server in response to a request for the user credentials. The operations performed by the mobile device at block 710 can be substantially similar to the operations performed by the mobile device at block 306 of FIG. 3. After the mobile device sends the user credentials to the server, the process ends.

As noted above in relation to FIG. 3, the user credentials sent to the server at block 710 may already be stored on the mobile device and thus may be sent with the initial request sent to the server at block 706, making block 710 optional. Additionally, although the operations depicted in FIG. 7 are described as being performed by a mobile device, the operations can be performed by any device with such capabilities.

The examples above may refer to various user interface elements as "clickable," which means that the particular user interface element can be "clicked". In this context, the term "click" is used to generally describe a user action that triggers an action associated with a particular user interface element. Different implementations may implement "clicks" in different manners and it is not necessary for a "click" to occur via an external device like a mouse. For example, in some implementations a "click" may result from a user tapping a touchscreen with the user's finger. As another example, in some implementations the action may be triggered using voice control which, for the purposes of the examples described herein constitute a "click".

Although the flowcharts depicted in FIGS. 2 through 5 and FIG. 7 present the operations as being performed in a particular order, some operations may be performed in different orders, in parallel, or not at all. For example, the operations at block 404 of FIG. 4 may be performed after the operations of block 410 of FIG. 4, or the operations of blocks 404 and 410 of FIG. 4 may be performed in parallel or in reverse order. Further, additional operations not depicted may be performed as part of the processes illustrated in the flowcharts. These additional operations may be sub-operations of the operations depicted in the flowcharts, operations that are performed between the operations depicted in the flowcharts, operations that are performed in parallel between the operations depicted in the flowcharts, etc.

Although described as a second embodiment, aspects associated with the system depicted in FIG. 6 may be combined with aspects depicted in FIG. 1 and vice versa. The examples depicted in FIG. 1 and FIG. 6 are separated for ease of understanding the various possible differences and the different aspects discussed in the respective examples should not be construed as mutually exclusive unless explicitly stated.

As will be appreciated by one skilled in the art, aspects of the inventive subject matter herein may be embodied as a system, method or computer program product. Accordingly, aspects of the inventive subject matter herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the inventive subject matter herein may take the form of a computer program product embodied in one or more machine-readable medium(s) having machine-readable program code embodied thereon.

Any combination of one or more machine-readable medium(s) may be utilized. The machine-readable medium may be a machine-readable signal medium or a machine-readable storage medium. A machine-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium does not include transitory, propagating signals.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

Computer program code for carrying out operations for aspects of the inventive subject matter herein may be written in any combination of one or more programming languages, including an object-oriented programming language such as Java®, C++ or the like; a dynamic programming language such as Python; a scripting/interpreted language such as the Perl programming language or the PHP programming language; and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the inventive subject matter herein are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Any device (computing system, server, mobile device, etc.) described herein can be implemented as a virtual machine. For example, a server may not be a physical server but may be a virtual server operating in the "cloud". As another example, a machine-readable medium may be a virtual drive that is implemented across multiple physical machine-readable mediums. Similarly, any network described herein may comprise a virtualized. For example, a network may be implemented using virtual machines and/or software-defined networking.

Figure 8:
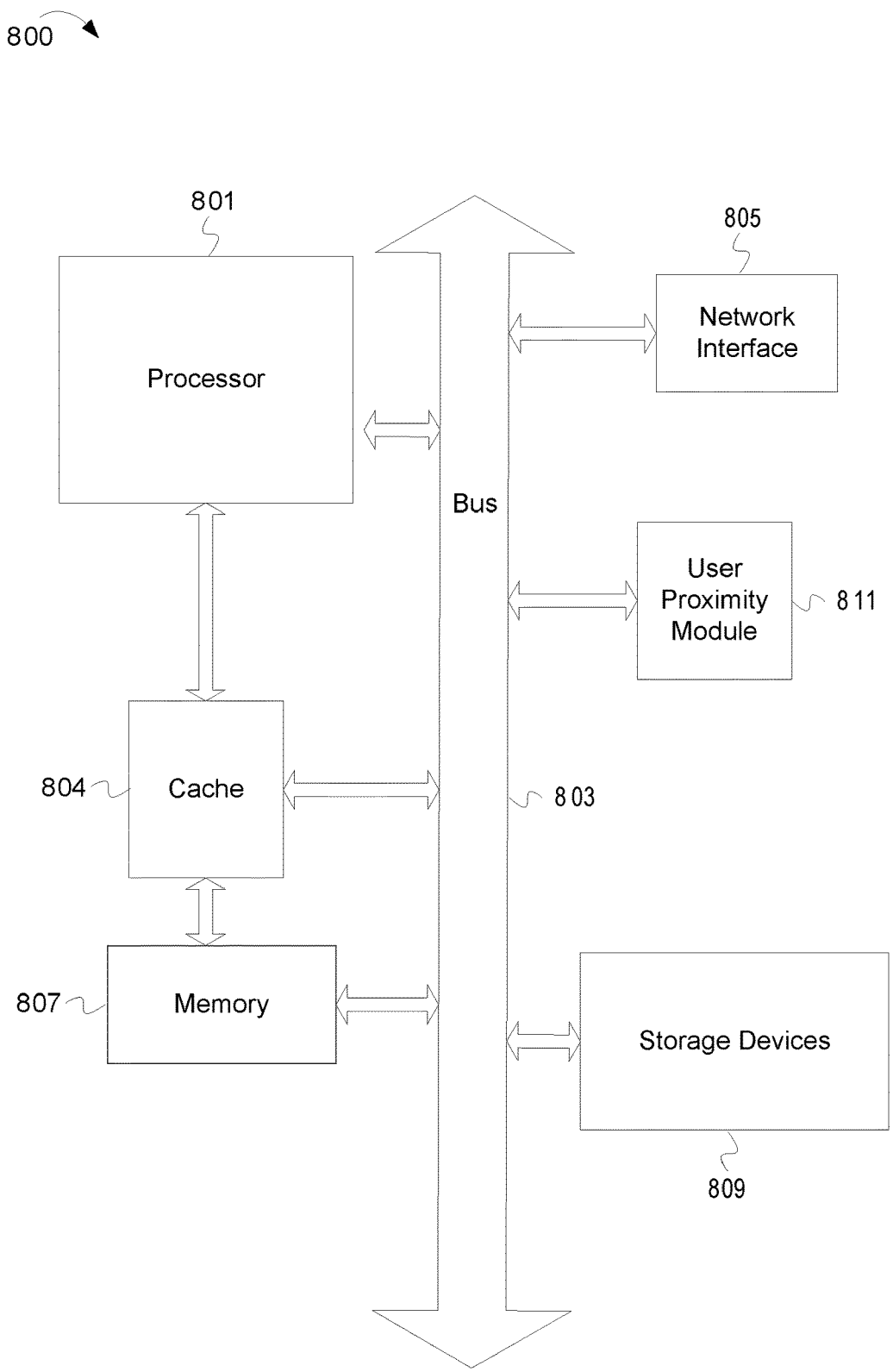
FIG. 8 depicts an example computer system for detecting the proximity of a user to particular location and performing one or more operations based, at least in part, on detecting the proximity of the user to the particular location.

FIG. 8 depicts an example computer system for detecting the proximity of a user to particular location and performing one or more operations based, at least in part, on detecting the proximity of the user to the particular location. A computer system includes a processor 801 (possibly including multiple processors, multiple cores, multiple nodes, and/or implementing multi-threading, etc.). The computer system includes memory 807. The memory 807 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above described possible realizations of machine-readable media. The computer system also includes a bus 803 (e.g., PCI, ISA, PCI-Express, HyperTransport®, InfiniBand®, NuBus, etc.), a network interface 805 (e.g., an ATM interface, an Ethernet interface, a Frame Relay interface, SONET interface, wireless interface, etc.), and a storage device(s) 809 (e.g., optical storage, magnetic storage, etc.). The user proximity module 811 embodies functionality to implement embodiments described above. The user proximity module 811 may include one or more functionalities that facilitate determining that a user or device is within a particular distance of a base station, identifying metadata associated with the user, or sending the user metadata to a computing system that may perform one or more operations based, at least in part, on the user metadata. Any one of these functionalities may be partially (or entirely) implemented in hardware and/or on the processor 801. For example, the functionality may be implemented with an application specific integrated circuit, in logic implemented in the processor 801, in a co-processor on a peripheral device or card, etc. Additionally, any one of these functionalities may be partially (or entirely) implemented in the memory 807. For example, the functionality may be implemented using program code that is read into the memory 807 from one or more storage devices (e.g., storage device(s) 809) and executed by the processor 801. Further, realizations may include fewer or additional components not illustrated in FIG. 8 (e.g., video cards, audio cards, additional network interfaces, peripheral devices, etc.). The processor 801, the storage device(s) 809, and the network interface 805 are coupled to the bus 803. Although illustrated as being coupled to the bus 803, the memory 807 may be coupled to the processor 801.

While the embodiments are described with reference to various implementations and exploitations, it will be understood that these embodiments are illustrative and that the scope of the inventive subject matter is not limited to them. In general, techniques for performing operations based on a user or device's proximity to a particular location as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

As used herein, the term "or" is inclusive unless otherwise explicitly noted. Thus, the phrase "at least one of A, B, or C" is satisfied by any element from the set {A, B, C} or any combination thereof, including multiples of any element.

What is claimed is:

1. A method comprising:
    sending, by a base station, a proximity message comprising a base station identifier and a network address, wherein the base station identifier is associated with the base station;
    receiving, by a mobile device, the proximity message;
    determining, by the mobile device, that the mobile device is within a particular distance of a base station based, at least in part, on the proximity message;
    in response to determining that the mobile device is within the particular distance of the base station, sending, by the mobile device, a proximity notification to a server identified by the network address, wherein the proximity notification comprises the base station identifier and a user identifier;
    in response to receiving the proximity notification,
        determining, by the server, user metadata associated with the user identifier;
        determining, by the server, a computing system based, at least in part, on a mapping between the base station identifier and a computing system identifier associated with the computing system; and
        sending, by the server, the user metadata to the computing system.

2. The method of claim 1, further comprising:
    in response to receiving the proximity notification,
        determining, by the server, base station metadata based, at least in part, on the base station identifier; and
        sending the base station metadata to the mobile device.

3. The method of claim 2, wherein the proximity notification comprises a request for a webpage and the base station metadata comprises the webpage.

4. The method of claim 1, further comprising:
    receiving, by the computing system, the user metadata; and
    performing, by the computing system, at least one operation associated with the user metadata.

5. The method of claim 4, wherein the at least one operation associated with the user metadata comprises determining whether a user associated with the user metadata is authorized to access a particular location, one or more goods, or one or more services.

6. The method of claim 1, further comprising:
    receiving, by the mobile device, a response to the proximity notification; and
    in response to receiving the response to the proximity notification, sending, by the mobile device, user credentials to the server.

7. The method of claim 1,
    wherein sending, by the base station, the proximity message comprises sending, by the base station, the proximity message via a wireless network; and
    wherein sending, by the mobile device, the proximity notification comprises sending, by the mobile device, the proximity message via a cellular network.

8. The method of claim 1, further comprising determining, by the server, that the mobile device is within the particular distance of the base station.

9. The method of claim 1,
    wherein the user identifier comprises a mobile device identifier associated with the mobile device; and
    wherein determining, by the server, the user metadata associated with the user identifier comprises determining, by the server, the user metadata based, at least in part, on a mapping between the mobile device identifier and the user metadata.

* * * * *